United States Patent
Sebastian et al.

(10) Patent No.: US 10,303,817 B2
(45) Date of Patent: May 28, 2019

(54) SYSTEM AND METHOD FOR ENHANCED EMULATION OF CONNECTED VEHICLE APPLICATIONS

(71) Applicant: Tata Elxsi Limited, Bengaluru (IN)

(72) Inventors: Gnanaprakash Sebastian, Bangalore (IN); Karthikeyan Padmanaban, Bangalore (IN); Biswajit Biswas, Bangalore (IN); Rajagopalan Rajappa, Bangalore (IN)

(73) Assignee: Tata Elxsi Limited, Bengaluru (IN)

( * ) Notice: Subject to any disclaimer, the term of this patent is extended or adjusted under 35 U.S.C. 154(b) by 146 days.

(21) Appl. No.: 15/216,157

(22) Filed: Jul. 21, 2016

(65) Prior Publication Data

US 2017/0024500 A1   Jan. 26, 2017

(30) Foreign Application Priority Data

Jul. 21, 2015 (IN) .......................... 3750/CHE/2015

(51) Int. Cl.
*G06F 9/455* (2018.01)
*G06G 7/70* (2006.01)
(Continued)

(52) U.S. Cl.
CPC ....... *G06F 17/5009* (2013.01); *G01M 17/007* (2013.01); *G06F 11/3664* (2013.01); *G06F 11/3696* (2013.01); *G06F 2217/04* (2013.01)

(58) Field of Classification Search
CPC ............. G06F 17/5009; G06F 11/3664; G06F 11/3696
(Continued)

(56) References Cited

U.S. PATENT DOCUMENTS

2007/0271079 A1* 11/2007 Oguchi .............. H04B 17/3912
                                                        703/8
2012/0192153 A1*  7/2012 Venkatraman ...... G06F 11/3664
                                                        717/124
(Continued)

OTHER PUBLICATIONS

Walton Fehr, "Southeast Michigan Test Bed 2014 Concept of Operations," Dec. 2014, US Department of Transportation, p. 42-43 ("Fehr").*

*Primary Examiner* — Aniss Chad
*Assistant Examiner* — Faraj Ayoub
(74) *Attorney, Agent, or Firm* — Finnegan, Henderson, Farabow, Garrett & Dunner LLP (57) ABSTRACT

An emulator for a test scenario corresponding to a connected vehicle application is presented. The emulator includes a test bed for testing a device under test (DUT) communicatively coupled to emulated intelligent transportation system (ITS) stations. The test bed also includes a processor configured to emulate the test scenario based on user-defined configuration parameters that define a behavior of the DUT and each of the emulated ITS stations during simulated events in the test scenario. The processor further includes a mobility engine configured to generate and periodically update one or more mobility parameters corresponding to the DUT and the emulated ITS stations based on the corresponding configuration parameters. The test bed further includes a channel emulator, a controller area network (CAN) simulator, and a global navigational satellite system (GNSS) simulator integrated into a single test bed for holistically emulating the test scenario and validating a desired functionality of the DUT.

16 Claims, 3 Drawing Sheets

(51) Int. Cl.
*G06F 17/50* (2006.01)
*G01M 17/007* (2006.01)
*G06F 11/36* (2006.01)

(58) Field of Classification Search
USPC .......................................................... 703/8
See application file for complete search history.

(56) References Cited

U.S. PATENT DOCUMENTS

| | | | | |
|---|---|---|---|---|
| 2013/0345926 | A1* | 12/2013 | Boulton | G01M 17/007 701/32.8 |
| 2015/0078291 | A1* | 3/2015 | Guner | H04W 84/18 370/329 |
| 2015/0178998 | A1* | 6/2015 | Attard | G07C 5/008 701/23 |
| 2017/0032402 | A1* | 2/2017 | Patsiokas | G06Q 30/0266 |

* cited by examiner

SYSTEM AND METHOD FOR ENHANCED EMULATION OF CONNECTED VEHICLE APPLICATIONS

PRIORITY CLAIM

This U.S. patent application claims priority under 35 U.S.C. § 119 to: India Provisional Application No. 3750/CHE/2015, filed Jul. 21, 2015, and its Non-Provisional Application No. 3750/CHE/2015, filed Jul. 21, 2016. The entire contents of the aforementioned applications are incorporated herein by reference.

TECHNICAL FIELD

The present description relates generally to emulators. More specifically, the present description relates to enhanced emulation of Intelligent Transportation Systems (ITS) and associated connected vehicle applications.

BACKGROUND

Advancements in automotive digital technology leverage the immense computing power available in present day vehicles for optimizing not only a vehicle's internal functions, but for developing connectivity with the outside world. These connected vehicle applications are typically referred to as Cooperative Intelligent Transport Systems (C-ITS), Car-2-Car (C2C), Vehicle-to-Vehicle (V2V), Car-2-Infrastructure (C2I), Vehicle-to-Infrastructure (V2I), Car-to-Everything (C2X), or collectively as Vehicle-to-Everything (V2X) applications.

Typically, V2X applications may entail use of radio communication links to form adhoc communications networks with other similarly equipped vehicles, pedestrians, and/or infrastructure units such as roadside units, traffic lights and connected devices, for automatically communicating position and other information. The communicated information, in turn, may be used along with existing technology such as autonomous in-vehicle sensors to provide additional capabilities. These additional capabilities, for example, may include sensing the surrounding environment for enabling automated driver assistance, traffic management, road maintenance, and predicting or detecting hazards and potentially life-critical situations. Thus, even the slightest delay or error in communicating the information may result in loss of life and property. Therefore, V2X applications may be thoroughly tested and validated before deployment in real world systems.

Efficient design and implementation of test frameworks used for testing V2X applications, however, may entail significant technical and/or logistical challenges. For example, ensuring robustness of safety applications and algorithms in presence of obstructions, varying weather conditions, different terrains, presence or absence of unconnected and connected vehicles, and/or other connected systems, may be difficult unless optimized before manufacture.

Accordingly, certain conventional test systems may employ computer simulations followed by on-road testing. For example, certain conventional simulators may provide simplified simulations corresponding to mobility of vehicles and/or traffic conditions. Such simulation testing may be followed by extensive experiments and trials at test tracks and/or on actual roads. Test tracks and actual road testing, however, may allow for only limited coverage of the considerable number of potential scenarios and participating vehicles that may be encountered in real life. Further, it may be difficult to replicate detected issues exactly in subsequent road tests. Additionally, road testing can be expensive in terms of provision of physical assets and/or human resources, and may often place a driver and the vehicle under grave safety risks.

Certain alternative approaches may employ emulators that use actual on-board units (OBUs) and/or roadside units (RSUs) to emulate various testing scenarios for desired V2X applications in a laboratory environment. However, the number of emulated OBUs or RSUs in a testing scenario may be restricted to a small number of devices that can be synchronously managed by such conventional V2X emulators. Thus, conventional V2X emulators often provide inadequate scalability of the testing scenarios to include a few tens to a few hundreds of stations, which requires considerable expense, complexity, and time. Moreover, conventional emulators typically include no provision for testing the OBUs and RSUs for unauthorized access, and testing for interoperability of devices from different manufacturers. Conventional V2X emulators, thus, may fail to provide holistic and/or exhaustive testing of V2X applications to ensure safety of passengers, vehicles, and surrounding infrastructure. Particularly, conventional emulators may not have any provision to allow testing of a variety of aspects of V2X applications running on a vehicle's actual on board unit (OBU) hardware by simulating vehicle mobility and their associated effects in real world conditions.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

According to an exemplary aspect of the present disclosure, an emulator for emulating a test scenario corresponding to a connected vehicle application is disclosed. The emulator includes a test bed for validating a device under test (DUT) that is communicatively coupled to one or more emulated intelligent transportation system (ITS) stations, wherein the DUT and each of the emulated ITS stations include a vehicle on-board unit (OBU) or an infrastructure unit (IU). The test bed includes a processor configured to execute one or more instructions to emulate the test scenario comprising the one or more simulated events involving the DUT and at least one of the emulated ITS stations. The processor further includes a mobility engine configured to generate and periodically update one or more mobility parameters corresponding to the DUT and each of the emulated ITS stations for the simulated events based on corresponding configuration parameters, wherein the configuration parameters define a behavior of the DUT and each of the emulated ITS stations during one or more simulated events in the test scenario. The test bed further includes a channel emulator configured to generate one or more channel models for emulating one or more wireless channel conditions between the DUT and one or more of the emulated ITS stations based on the corresponding mobility parameters. The test bed also includes a controller area network (CAN) simulator configured to emulate one or more CAN signals that are transmitted and received by one or more internal components corresponding to one or more of the DUT and the emulated ITS stations based on the corresponding mobility parameters. Additionally, the test bed includes a global navigational satellite system (GNSS) simulator configured to generate one or more GNSS signals for simulating mobility of one or more of the DUT and the ITS stations based on the corresponding mobility parameters. The emulator further includes a transceiver operatively coupled to the processor and configured to generate and transmit one or more periodic messages between the DUT and one or more of the emulated ITS stations and one or more asynchronous messages between the DUT and one or more of the emulated ITS stations upon occurrence of one of the simulated events. The processor is configured to validate a desired functionality of the DUT by determining if one or more of the periodic messages, the asynchronous messages and CAN signals are generated by the DUT as expected within a defined time limit.

According to another exemplary aspect of the present disclosure, a method for emulating a test scenario corresponding to a connected vehicle application is presented. The method includes receiving one or more configuration parameters that define a behavior of a DUT and one or more emulated ITS stations during one or more simulated events involving the DUT and at least one of the emulated ITS stations in the test scenario, wherein the DUT is communicatively coupled to the emulated ITS stations, and wherein the DUT and each of the emulated ITS stations comprise a vehicle on-board unit (OBU) or an infrastructure unit. The method further includes generating and periodically updating one or more mobility parameters corresponding to the DUT and each of the emulated ITS stations for the simulated events by a mobility engine based on corresponding configuration parameters. The method also includes generating one or more channel models for emulating wireless channel conditions between the DUT and one or more of the emulated ITS stations by a channel emulator based on the corresponding mobility parameters. Additionally, the method includes emulating one or more CAN signals that are transmitted and received by one or more internal components corresponding to one or more of the DUT and the emulated ITS stations by a CAN simulator based on corresponding mobility parameters. Moreover, the method includes generating one or more GNSS signals for simulating mobility of one or more of the DUT and the ITS stations by a GNSS simulator based on the corresponding mobility parameters, wherein the mobility engine, the channel emulator, the CAN simulator, and the GNSS simulator integrated within a single test bed and are synchronously controlled to generate the mobility parameters, the channel models, the CAN signals, and the GNSS signals, respectively. Further, the method includes applying the corresponding mobility parameters, the channel models, the CAN signals, and the GNSS signals to the DUT and each of the emulated ITS stations to holistically emulate and execute the test scenario. The method also includes generating and transmitting one or more periodic messages between the DUT and one or more of the emulated ITS stations and one or more asynchronous messages between the DUT and one or more of the emulated ITS stations upon occurrence of one of the simulated events during execution of the test scenario. Moreover, the method includes validating a desired functionality of the DUT by determining if one or more of the periodic messages, the asynchronous messages and CAN signals are generated by the DUT as expected within a defined time limit.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, wherein.

DETAILED DESCRIPTION

The following description presents exemplary systems and methods for enhanced emulation of V2X applications using an innovative test bed within a laboratory environment. Particularly, embodiments of the present systems and methods describe integration of certain external emulators, in addition to conventional V2X emulator modules, into a single test bed in a manner that allows for testing of synergistic effects that are not captured via use of any of these emulators individually. For example, embodiments of the present systems and methods allow for integration of a channel emulator, a Controller Area Network (CAN) simulator, and a Global Navigation Satellite System (GNSS) simulator in addition to V2X emulator modules to setup real-world test scenarios. Specifically, the various emulators may be synchronously controlled, for example, to accurately emulate physical effects that the device under test (DUT) experiences due to operation parameters such as the relative positions, relative speeds and directions of neighboring vehicles, the presence of obstructions and spatial topology of the test scenario.

Thus, unlike conventional V2X emulators that typically test each operational component individually, and therefore, are unable to account for synergistic effects, embodiments of the present system and method may provide realistic emulation of testing scenarios for testing various V2X applications running on prototypes and/or production hardware. An exemplary framework that is suitable for practicing various implementations of the present system is discussed in the following sections with reference to FIG. 1.

Figure 1:
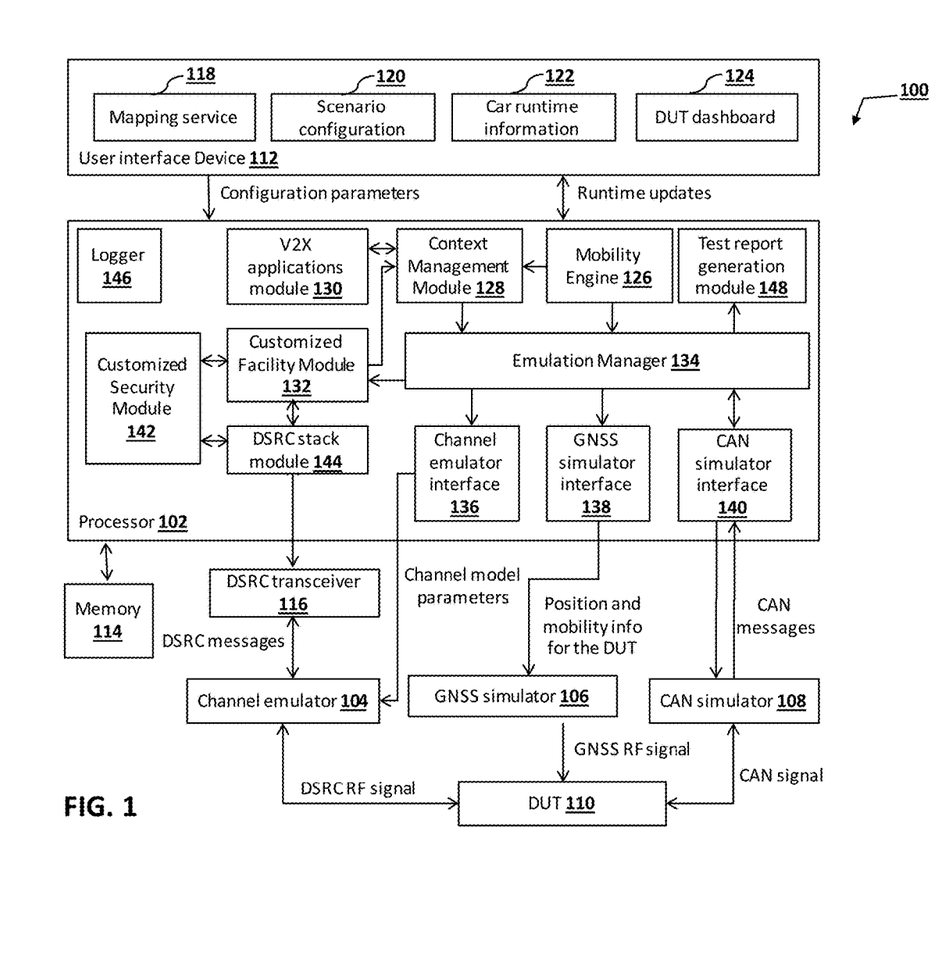
FIG. 1 illustrates an exemplary emulator for use in holistic testing of V2X applications in a laboratory environment, according to an embodiment of the present disclosure.

FIG. 1 illustrates an exemplary emulator 100 for use in holistic testing of V2X applications in a laboratory environment. Particularly, the emulator 100 may be configured to simulate signals that are transmitted and/or received by different internal systems of a vehicle and/or external entities to emulate a desired test scenario. The simulation may allow for holistic testing of algorithms, breadboards, prototypes, applications, and/or complete vehicular systems under various operating conditions.

For clarity, the present embodiment of the emulator 100 is described with reference to a test bed that emulates the functionality and behavior of land vehicles and infrastructure units that are communicatively coupled to each other, for example, via radio communications links. However, alternative embodiments of the emulator 100 may similarly be used to emulate test scenarios for testing functionality and performance of V2X applications for other kinds of vehicles such as vehicles operated over or under water, and/or in air.

Generally, connected vehicles may be configured to use available communication links to form ad-hoc communications networks with other similarly equipped vehicles or infrastructure units such as roadside units, traffic lights and other connected devices, for automatically communicating position and other information. This information may be then used to allow the connected vehicles and infrastructure units to cooperate to significantly reduce traffic accidents and fatalities, while also improving traffic management.

Accurately determining and communicating information generated by V2X-enabled vehicles in real time may be useful for detecting hazards in a timely manner during safety-critical situations. Accordingly, each V2X scenario may be thoroughly tested and validated before deployment in actual vehicles. However, as previously noted, conventional emulators test the various aspects of a V2X-enabled vehicle independently. For example, a controller area network (CAN) simulator may be used to validate messaging between various internal vehicle components and systems. Similarly, a global navigation satellite system (GNSS) simulator may be used to simulate geographical conditions that may be encountered by a moving vehicle during a selected testing scenario. Additionally, a channel emulator may be used to emulate different communications channel conditions. However, testing each of these functionalities independently may not be sufficient to ensure that the systems work cohesively and in an expected manner in a real-world scenario. For example, presence of an obstruction and/or increase in speed of the vehicle may change the channel conditions being experienced by the vehicle.

Accordingly, the emulator 100 may be configured to emulate a test scenario that accounts for synergistic effects that a device under test (DUT) experiences when simultaneously receiving positioning information from a GNSS receiver, in-vehicle signals on the CAN bus and wireless messages from a DSRC transceiver. To that end, in one embodiment, the emulator 100 includes a processor 102, a channel emulator 104, a GNSS simulator 106, and a CAN simulator 108 communicatively coupled to each other and embedded within the same test bed. The processor 102 may be configured to synchronously control operation of the channel emulator 104, the GNSS simulator 106, and the CAN simulator 108 for emulating a desired testing scenario for testing a desired functionality of at least one device under test (DUT) 110. The DUT 110, for example, may include an electronic control unit to be deployed within a vehicle, or an infrastructure unit such as an RSU. Further, the processor 102, for example, may include one or more application-specific processors, graphical processing units, digital signal processors, microcomputers, microcontrollers, Application Specific Integrated Circuits, and/or Field Programmable Gate Arrays.

In one embodiment, the processor 102 may be communicatively coupled to a user interface (UI) device 112 that allows a user to input or select one or more configuration parameters that define the desired test scenario for the DUT 110. In one embodiment, the UI device 112, for example, includes a laptop, a personal digital assistant, a control panel, or any other suitable input/output device that accepts and/or outputs audio, visual, and/or tactile data. In certain embodiments, the UI device 112 includes a graphical user interface (GUI) including selectable options for defining the configuration parameters for holistic testing of the desired V2X test scenario.

Holistic testing of a V2X test scenario, for example, may entail emulation of traffic load conditions involving multiple ITS stations (vehicles, RSUs, etc.), mobility parameters of the DUT 110 and the ITS stations, real road topologies, and wireless channel conditions. Additionally, emulating the V2X test scenario may entail emulating means for securing the wireless messages exchanged between the participating ITS stations, support for different geographies and associated standards, and repeatability of the test scenarios through record and replay capability.

Accordingly, in one embodiment, the UI device 112 includes a mapping service module 118, a scenario configuration interface 120, a runtime information interface 122, and a DUT dashboard 124 to allow the user to define different configuration parameters for holistic testing of the desired V2X test scenario and also to visualize the scenario under test. In one embodiment, the user may define the test scenario by configuring real road topologies such as multi-lane scenarios and roadblock scenarios using the mapping service module 118. In one embodiment, the mapping service module 118 may use two-dimensional (2D) or 3-dimensional (3D) mapping information from Google maps and Bing maps that provide a graphical map based visualization of the test scenario. Further, the user may define configuration parameters such as a station identifier (ID), speed, acceleration, deceleration, vehicle profile, and route information of an emulated OBU using the scenario configuration interface 120. Similarly, the user may use the scenario configuration interface 120 to define a station ID, position, a station type, and warning type of an emulated RSU.

In certain embodiments, the user may also define the number of participating stations, station profile parameters, confidence ratios corresponding to the station profile parameters, atmospheric condition values, and channel models corresponding to the participating ITS stations using the scenario configuration interface 120. Each of the participating ITS stations such as an OBU and an RSU may have a corresponding station profile. An OBU profile, for example, may include station profile parameters such as position information, route information, direction of travel, speed, lane, vehicle mass, dimensions, wheelbase, axel track, steering ratio, and the like. Additionally, an RSU profile may include station profile parameters such as position information, RSU type, warning type, and the like.

Further, the channel models defined by the user for each participating ITS station, for example, may include fading models (such as Rayleigh model and Rician model), log-distance path loss model, Doppler shift model, and Ray tracing model. In one embodiment, the user may configure the same channel model between each emulated station and the DUT 110. Alternatively, the user may configure different channel models between each of the emulated stations and the DUT 110.

Additionally, the user may use the runtime information interface 122 to visualize or monitor runtime information such as the current speed and direction of travel of the emulated stations and the DUT 110 with different color-coding for the emulated stations and the DUT 110. Moreover, the user may use the DUT dashboard 124 to visualize or monitor the simulated event sequences in the test scenario and associated information. In one embodiment, for example, the user may use the DUT dashboard 124 to visualize a speedometer showing an emulated speed of the DUT 110 during test execution.

In certain embodiments, the processor 102 may receive the configuration parameters defined by the user using the UI device 112, for example, via an Ethernet connection. The processor 102 may use the received configuration parameters to emulate various aspects of the ITS stations participating in the defined test scenario, execute the test scenario, and log corresponding test results. To that end, in one embodiment, the processor 102 includes a mobility engine 126, a context management module 128, a V2X applications module 130, a customized facility module 132, and an emulation manager 134.

In certain embodiments, the mobility engine 126 may generate one or more mobility parameters corresponding to the DUT 110 and emulated ITS stations based on the received configuration parameters. Particularly, the mobility engine 126 may compute the mobility parameters corresponding to each of the emulated ITS stations and the DUT 110 to define an expected behavior of the DUT and the emulated stations during execution of the test scenario. These mobility parameters, for example, may include a simulated position, velocity, direction of travel, acceleration, and deceleration. Further, the mobility parameters may also include a latitude, longitude, altitude, direction, yaw rate, steering wheel angle, curvature, and the like corresponding to the DUT 110 and/or each of the emulated ITS stations.

In certain embodiments, the V2X emulation manager 134 may periodically invoke the mobility engine 126 to update the mobility parameters. Specifically, the mobility engine 126 may be configured to update the mobility parameters for the DUT 110 and/or one or more of the emulated ITS stations based on a rate of update of GNSS data, for example, every 100 milliseconds (ms). The continually updated mobility parameters may be indicative of a change in position, direction, speed, or trajectory of the DUT 110 and/or an ITS station during the course of execution of the test scenario.

In one embodiment, the mobility engine 126 may communicate the computed mobility parameters for the DUT 110 and the other emulated ITS stations to the context management module 128. The context management module 128 may update the context information for the DUT 110 and each of the emulated ITS stations based on corresponding mobility parameters. In one embodiment, the context management module 128 may continually update at least a part of context information corresponding to the DUT 110 and one or more of the emulated ITS stations, for example, based on periodically decoded Dedicated Short Range Communication (DSRC) messages received from the customized facility module 132. The updated context information may be used by different components of the emulator 100 to emulate a particular aspect of the test scenario, while taking into account synergistic effects of the other aspects.

In one embodiment, for example, the GNSS simulator 106 may receive the mobility parameters and/or the context information via the GNSS simulator interface 138. Upon receiving a trigger from the V2X emulation manager 134, the GNSS simulator 106 may simulate GNSS signals for emulating the mobility conditions for the DUT 110 based on the mobility parameters and/or the context information.

Specifically, the GNSS simulator 106 may generate the GNSS RF signal for emulating a desired location, date, and/or time (present, past, and future) based on the mobility parameters and/or the context information representative of an aspect of the test scenario. Further, the GNSS simulator 106 may simulate GNSS signals using an algorithm that takes into account effects of different speeds, positions, and vehicle dynamics as defined in the context information. Moreover, the GNSS simulator 106 may model different atmospheric conditions to generate strong or weak GNSS signals for the DUT 110. For example, the GNSS simulator 106 may generate a weak GNSS signal when emulating a test scenario where the DUT 110 is positioned inside a tunnel, or is operating in bad weather. Alternatively, the GNSS simulator 106 may emulate weak GNSS signals for the DUT 110 when the mobility parameters indicate low confidence ratios, configured by the user, for the position accuracy of the DUT 110.

Similarly, the V2X emulation manager 134 may trigger the CAN simulator 108, via the CAN simulator interface 140, to simulate CAN signals such as brake pedal status, indicator lights, and steering wheel angles corresponding to the DUT 110 based on the mobility parameters and/or the context information. Moreover, the V2X emulation manager 134 may trigger the channel emulator 104, via a channel emulator interface 136, to emulate channel conditions in view of user-configured RF impairments such as Doppler effects between the DUT 110 and the emulated ITS stations.

In one embodiment, the channel emulator 104 may emulate the RF impairments based on user-configured channel model parameters. The channel emulator 104 may apply the radiofrequency (RF) impairments on the DSRC messages transmitted from a DSRC transceiver 116 in the emulator 100. Further, the channel emulator 104 may transmit the DSRC signal corresponding to the impaired DSRC messages to the DUT 110. Thus, the channel emulator 104 may be used to test the performance of the DUT 110 under poor RF conditions. Moreover, while testing the DUT 110, the channel models may be varied dynamically to emulate different channel models between each emulated station and the DUT 110.

In certain embodiments, the V2X emulation manager 134 may invoke the V2X applications module 130 to evaluate V2X safety threats for the emulated vehicles so that the emulated vehicles also behave as V2X enabled vehicles. Similarly, the V2X emulation manager 134 may trigger the customized facility module 132 to use the context information to generate cooperative awareness messages (CAM) and decentralized environmental notification messages (DENM) for the emulated stations periodically, or upon detecting a simulated event.

Particularly, in one embodiment, the customized facility module 132 may update the CAM and DENM based on a current context information of the emulated ITS station maintained in the context management module 128 such that the DUT 110 perceives the CAM and DENM to be originating from physically different OBUs and/or RSUs. The CAM may provide periodic information regarding a presence, position, movement, basic attributes, and basic status of the emulated ITS stations to the DUT 110. Thus, the CAM may aid in emulating cooperative periodic information sharing feature between a V2X-enabled vehicle and surrounding V2X-enabled vehicles and/or infrastructure units. However, the DENM may be triggered upon occurrence of simulated events such as road hazard detection, emergency braking detection, and other such events that signify a potential safety risk. In one embodiment, the CAM and DENM may be generated by the customized facility module 132 in a time-interleaved fashion for emulating communications between multiple ITS stations participating in the desired test scenario.

In certain embodiments, the customized facility module 132 may be implemented as a multi-station facility module that is developed over the transport, network, and 802.11p layers of the DSRC stack. Further, due to the extremely short latency requirement in the vehicular communication systems, the network, transport, and 802.11p protocol layers of the DSRC stack 144 may be implemented in the processor 102. In one embodiment, the DSRC stack 144 may receive the CAM and DENM from the customized facility module 132, add protocol headers, and transform the CAM and DENM for transmission over an RF medium using the DSRC transceiver 116.

In certain embodiments, secure transmission and reception of the wireless messages between the emulated ITS stations and the DUT 110 may be emulated by a customized security module 142 in the processor 102. In one embodiment, the customized security module 142 may use valid and invalid digital certificates for emulating authorized and unauthorized ITS stations defined by the user while configuring the test scenario. The processor 102 may verify a response of the DUT 110 when it encounters the emulated authorized and unauthorized ITS stations, thereby testing performance of a security feature of the DUT 110.

Generally, the DUT 110 may be expected to generate and communicate a warning message, for example, to a human machine interface (HMI) of an actual vehicle in response to the emulated safety scenarios within a defined time limit using a CAN bus (not shown). Accordingly, during the test execution, the CAN simulator 108 may be configured to receive the warning messages from the DUT via the CAN simulator interface 140 to a logger 146 and a test report generation module 148 to determine a success or failure of the executed test scenario.

In one embodiment, the logger 146 may provide logging support for behavior of the DUT 110 based on the CAN signals originating from the DUT 110 and/or the emulated ITS stations. In one embodiment, the test report generation module 148 may be configured to validate whether the DUT 110 generated the required response within the defined time limit. Further, the test report generation module 148 may generate a test report based on the warning message generated by the DUT 110. The test report, for example, may include at least one of a test pass status, a test fail status, a message latency value, a time to event value, a distance to event value, a missed detection probability value, a false detection probability value, and a bit error rate (BER) value.

In one embodiment, the test report may be stored in a memory 114 along with the configuration parameters, mobility parameters, DSRC messages, CAN messages, test statistics, a set of log and debug information, and a set of instructions to be executed by the processor 102 to test the DUT 110. In certain embodiments, the memory 114 may also store scenario configurations as a scenario file for testing a real world scenario inside the laboratory in a repeatable fashion, which may enable easier debugging and reduced development time compared to drive tests or test tracks.

The emulator 100, thus, may allow for reliable and holistic creation, reproduction, and repetition of a multitude of testing aspects within a laboratory environment, thereby significantly reducing drive testing requirements, and saving on cost and time expended in the field trials. Certain exemplary V2X application scenarios that may be validated though use of an embodiment of the emulator 100 are described in detail with reference to FIGS. 2-4.

Figure 2:
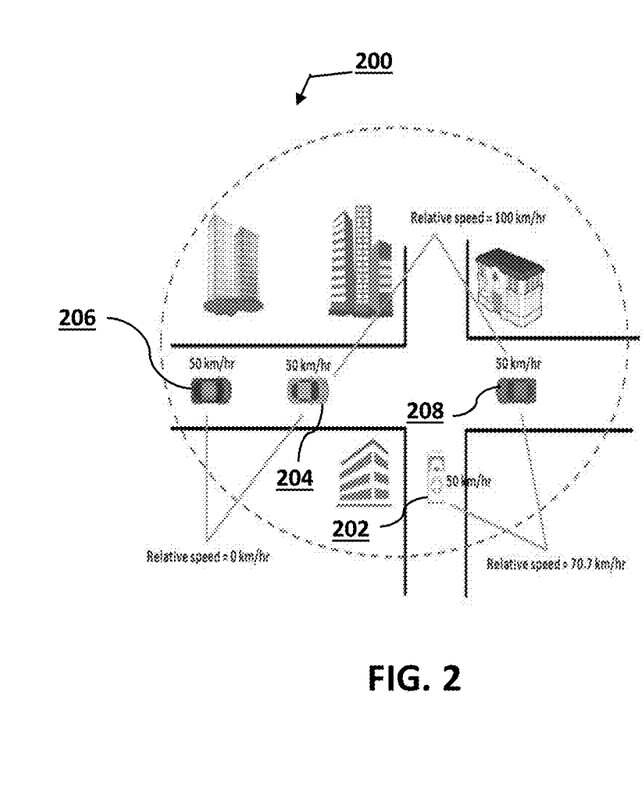
FIG. 2 depicts a graphical representation of an exemplary test scenario where channel conditions experienced by different ITS stations are distinct due to Doppler effects.

Particularly, FIG. 2 depicts a graphical representation 200 of an exemplary test scenario where channel conditions experienced by a DUT 202, such as the DUT 110 of FIG. 1, and one or more of the ITS stations 204, 206, and 208 are distinct due to Doppler effects. In the test scenario depicted in FIG. 2, the user may configure a road topology that includes a cross road using the mapping service module 118 of FIG. 1. Additionally, the user may configure the DUT 202 and the emulated ITS stations 204, 206, and 208 as traveling at the same speed and in the same communications range, but on different roads approaching the same junction to create an intersection collision scenario. For instance, the user may configure the speed of the DUT 202 and the emulated ITS stations 204, 206, and 208 to be 50 kilometers/hour. Although, the DUT 202 and the emulated ITS stations 204, 206, and 208 may be configured to travel at the same speed, their relative speeds may be different due to the Doppler Effect. Thus, the Doppler Effect may cause the DUT 202 and each of the ITS stations 204, 206 and 208 to experience channel conditions that are different even when traveling at the same speed.

Figure 3:
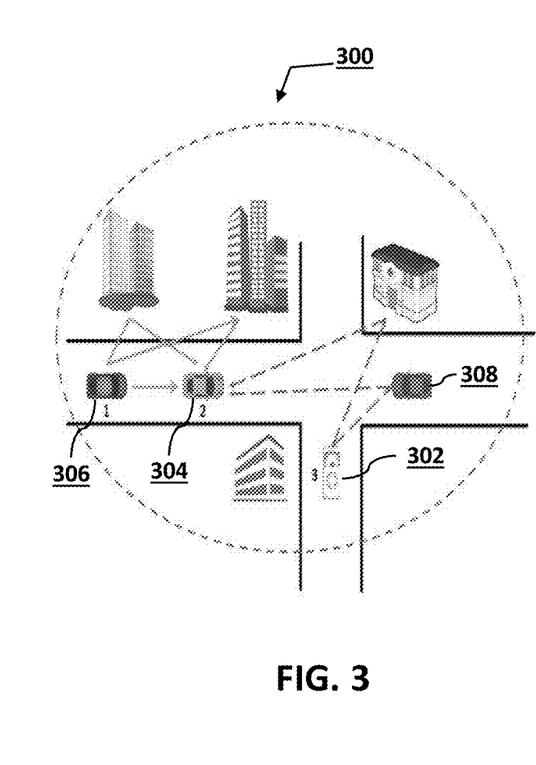
FIG. 3 depicts a graphical representation of an exemplary test scenario where channel conditions experienced by different ITS stations are distinct due to multipath fading effects.

Further, FIG. 3 depicts a graphical representation 300 of an exemplary test scenario where channel conditions experienced by a DUT 302, such as the DUT 110 of FIG. 1, and one or more of the ITS stations 304, 306, and 308 may be distinct due to distinct multipath fading effects. In order to test the performance of the DUT 302 in such a scenario, the user may configure different channel model parameters to accommodate different multipath effects between the DUT 110 and each of the emulated ITS stations 304, 306, and 308.

Such distinct channel conditions between the DUT 202, 302 and each of the corresponding emulated OBUs/RSUs 204, 206, 208, and 304, 306 and 308 may be reproduced by dynamically and synchronously switching the channel model parameters configured in the wireless channel emulator 104 of FIG. 1 depending on which of the emulated OBUs/RSUs are transmitting at that time.

The V2X emulation manager 134 may modify channel model parameters through the channel emulator interface 136. These channel model parameters may aid in emulating simple signal attenuations to complex multi-path, Doppler, and fading conditions. Similarly, various channel model parameters may be configured to depict real world conditions such as varying noise levels, urban and rural environments, hilly terrains, tunnels etc. In certain embodiments, V2X safety applications may also be tested under wireless channel models defined by various vehicular communication standards.

Figure 4:
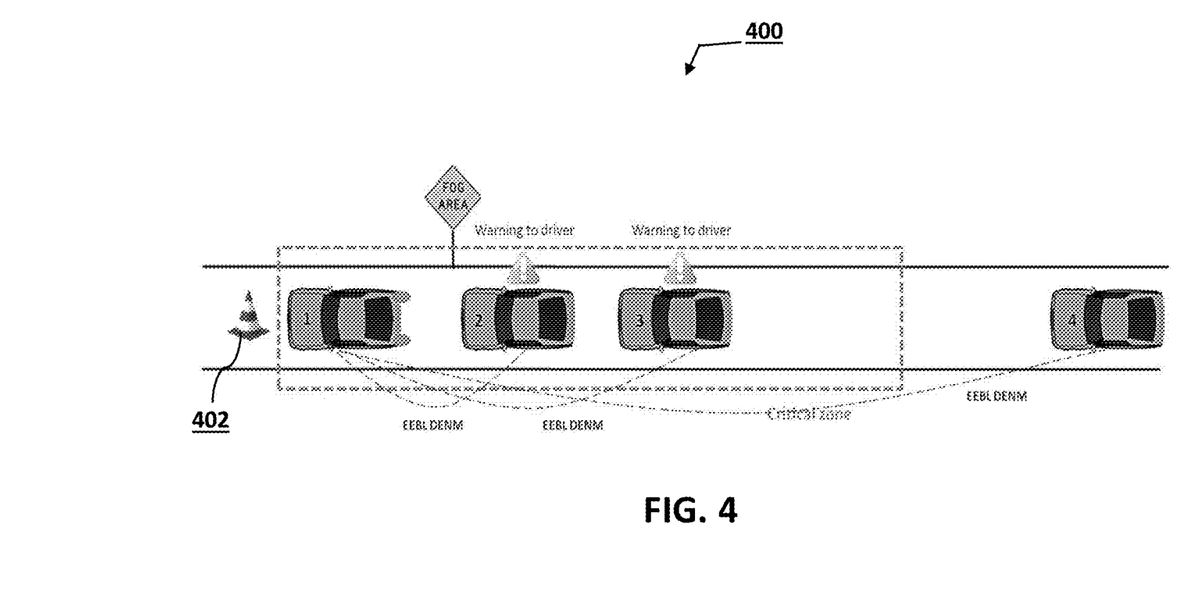
FIG. 4 depicts a graphical representation of an emergency electronic brake lights (EEBL) safety scenario that may be emulated using the emulator of FIG. 1.

Further, FIG. 4 depicts a graphical representation 400 of an emergency electronic brake lights (EEBL) safety scenario. In this scenario, there may be four cars travelling along a road, one behind the other. Due to bad weather conditions such as fog, rain or snow, the driver of Car-2 may be unable to see brake lights of Car-1. For the driver of Car-3, brake lights of Car-1 may be obstructed by Car-2. Hence, the driver of Car-3 may have to depend on the reaction of Car-2. Moreover, Car-4 may not be in the critical zone and may not affected by the behavior of Car-1, Car-2, and Car-3.

Due to an obstacle 402 on the road, Car-1 may apply a sudden brake. Since the brake lights of Car-1 may not be visible to Car-2 due to fog, the driver may not be able to react in time to apply brakes and prevent a rear end collision with Car-1. Due to the reduced reaction time, the driver of Car-3 may not be able to prevent a rear end collision with Car-2, thus resulting in a major accident on the road.

The EEBL feature in V2X-enabled cars may provide a mechanism to prevent such a situation. As shown in FIG. 4, Car-1 may generate and communicate an EEBL V2X message to Car-2, Car-3, and Car-4. Since Car-2 and Car-3 may be within the critical zone for the EEBL message from Car-1, Car-2 and Car-3 may provide a warning to the driver and may also preload corresponding brakes. The warning may provide an increased reaction time for drivers to apply brakes and prevent a rear end collision with the car ahead of them. Car-4 may receive the EEBL message but not take any action, as it may be outside the relevance or critical zone for the EEBL from Car-1.

In order to test the response of the DUT 110 of FIG. 1 in the EEBL scenario, the emulator 100 may be used recreate the EEBL safety scenario via suitable configuration parameters. In a first test scenario, Car-1 may correspond to the DUT 110 and Cars-2-4 correspond to the emulated ITS stations. In one embodiment, the user may configure the Cars-1-4 to travel at a constant speed using the scenario configuration interface 120. Particularly, the user may configure the Cars-1-4 to travel along a straight road one behind the other using the mapping service module 118.

Further, the mobility engine 126 may calculate the set of DUT (Car-1) mobility parameters and the set of mobility parameters for Cars-2-4. The V2X emulation manager 134 may use the set of DUT mobility parameters to communicate the position information of the Car-1 to the GNSS simulator 106 by way of the GNSS simulator interface 138. The GNSS simulator 106 may transmit the position information as a corresponding GNSS signal to the Car-1. Car-1 has a GNSS receiver, a CAN interface, a DSRC transceiver, and a V2X safety application module (not shown). The GNSS receiver of the Car-1 may decode the GNSS signal and forward the position information to the DSRC stack and the V2X safety applications running on the Car-1.

Further, the V2X emulation manager 134 may configure the channel emulator 104 using the channel emulator interface 136 to reflect the channel conditions between the Car-2 and the Car-1. Subsequently, the V2X emulation manager 134 may trigger the customized facility module 132 to generate and transmit a CAM corresponding to the Car-2. The generated CAM may be transmitted by the DSRC transceiver 116 to the channel emulator 104. The channel emulator may add channel impairments configured by the channel emulator interface 136 to the CAM, and generate the DSRC signal. The channel emulator 104 may then transmit the RF impaired DSRC signal to Car-1.

Further, the Car-1 may generate and transmit a DSRC (CAM) message corresponding to position information received from the GNSS simulator 106 and the CAN signal received from the CAN simulator 108. After being processed by the channel emulator 104, the DSRC message may be received by the DSRC transceiver 116 and forwarded to the customized facility module 132 using the DSRC stack 144. The DSRC (CAM) message may be decoded by the customized facility module 132 and the DUT station context information may be updated in the context management module 128.

Further, the V2X emulation manager 134 may reconfigure the channel emulator 104 to reflect the channel conditions between the Car-3 and the Car-1, and similarly Car-4 and the Car-1. Subsequently, the V2X emulation manager 134 may trigger the customized facility module 132 to generate and transmit a CAM corresponding to the Car-3, and another CAM to Car-4. Further steps for processing the CAM may be similar to the steps described herein with reference to the CAM transmitted for Car-2.

Subsequently, the V2X emulation manager 134 may trigger the CAN simulator 108 to transmit an emergency brake CAN signal to the Car-1 to emulate the EEBL scenario. Further, the V2X emulation manager 134 also may configure zero mobility on the GNSS simulator 106 using the GNSS simulator interface 138 to emulate a scenario in which the Car-1 has stopped on encountering an obstacle 402 by applying an emergency brake. On receiving the emergency brake CAN signal, the DSRC stack on the DUT 110 may respond by transmitting an EEBL DSRC (DENM) message.

After being processed by the channel emulator 104, the EEBL message may be received by the DSRC transceiver 116 and forwarded to the customized facility module 132 using the DSRC stack 144. The DSRC (DENM) message may then be decoded by the customized facility module 132 and the DUT station context information may be updated in the context management module 128 to indicate the occurrence of the EEBL event for the Car-1. The V2X application module 130 may check the relevance of the EEBL event for the Cars-2-4. As the Car-2 and the Car-3 are in the critical zone, a warning may be generated for the respective cars, and driver stop action may be simulated for the Car-2 and Car-3. Further, as the Car-4 is not in the critical zone, no actions may be taken for the Car-4.

In order to evaluate the response of Car-1, the logger 146 may log the occurrence of the EEBL event for Car-1 and, the test report generation module 148 may determine a test pass status if the measured communication latencies are within prescribed limits.

In an alternate test scenario, the Car-2 may correspond to the DUT 110. Further, Car-1, Car-3, and Car-4 may be the emulated stations. The user may configure the Cars-1-4 to travel at a constant speed via the scenario configuration interface 120. Additionally, the user may configure the Cars-1-4 to travel one behind the other along a straight road using the mapping service module 118. Further, the V2X emulation manager 134 may configure the channel emulator 104 to emulate bad weather conditions and triggers CAM transmissions for the Car-1, Car-3, and Car-4 in a time interleaved fashion as described in the previous embodiment where Car-1 is the DUT 110.

To trigger the EEBL scenario, the V2X emulation manager 134 may simulate a stoppage of the Car-1 and trigger an EEBL DSRC (DENM) message for the Car-2. The EEBL message may be received by the Car-2 and the V2X safety applications running on the Car-2 may determine whether the Car-2 is in the critical zone. If the Car-2 is in the critical zone, the V2X application module 130 may generate and communicate an EEBL warning message to the driver of Car-2 by way of the HMI on the CAN bus. The EEBL warning message may be received by the CAN simulator 108. Additionally, the CAN simulator 108 may forward the warning message to the logger 146 and the test report generation module 148 via the CAN simulator interface 140 and the V2X emulation manager 134. The test report generation module 148 may declare a test pass status if the measured latencies are within prescribed limits.

Further, the V2X application module 130 may verify the relevance of the EEBL event for the other emulated stations, namely Car-3 and Car-4. If the Car-3 is in the critical zone, an EEBL warning message may be generated, and a driver stop action simulated for the Car-3. Further, as the Car-4 is not in the critical zone, no action may be taken for the Car-4.

Embodiments of the emulator 100, thus, may efficiently emulate real world V2X scenarios for the DUT 110 using a wireless channel emulator, a CAN simulator, and a GNSS simulator, which may all be centrally managed and integrated into a single test bed. Generally, V2X systems based on the Institute of Electrical and Electronics Engineers (IEEE) Wireless Access in Vehicular Environments (WAVE), and European Telecommunications Standards Institute (ETSI) Intelligent Transport Systems G5 standards may employ 802.11p for the PHY and the MAC layer. The 802.11p PHY may be based on the 802.11a OFDM PHY and the 802.11p MAC may be based on the 802.11e. Here, it may be noted that the 802.11p is an amendment of the 802.11 that uses CSMA/CA to ensure that only one device transmits on the shared medium at any one time. The emulator 100 may exploit the inherent CSMA/CA property of 802.11p networks that allow only one device to transmit on the shared medium at a time to emulate messages from multiple OBUs/RSUs in a time interleaved fashion and thus test V2X applications using a single DSRC hardware/radio.

The emulator 100 also may aid in validating effectiveness of V2X applications that are configured to guard against messages received from unauthorized or misbehaving vehicles or roadside units. Certain embodiments of the emulator 100 may also validate bug fixes done on the DUT by saving and accurately repeating the test scenarios that triggered the bug. Moreover, the emulator 100 may allow for playback of recorded field conditions for the reproduction of drive tests within the laboratory and for testing interoperability of OBUs and RSUs from multiple vendors. The record and replay functionality may enable generation of accurate, easily measurable, repeatable metrics and test results that may be used for more efficient enhancements of the DUT.

Furthermore, the emulator 100 may support the IEEE WAVE and the ETSI ITS-G5 standards for the American and European regions; thus, the emulator 100 may also be used for emulating scenarios in different geographical regions. Additionally, the emulator 100 may also be used to test cellular-based V2X systems and/or V2X-aided Advanced Driver Assistance Systems (ADAS). For example, the emulator 100 may be used to test autonomous ADAS sensors for determining behavior of safety applications when the GNSS position information is compromised.

It may be noted that the foregoing examples, demonstrations, and process steps that may be performed, for example, by the mobility engine 126, the channel emulator 104, the GNSS simulator 106, and the CAN simulator 108 may be implemented by suitable code on a processor-based system, such as a general-purpose or a special-purpose computer. It may also be noted that different implementations of the present specification may perform some or all of the steps described herein in different orders or substantially concurrently.

Additionally, various functions and/or method steps described herein may be implemented in a variety of programming languages, including but not limited to Ruby, Hypertext Pre-processor (PHP), Perl, Delphi, Python, C, C++, or Java. Such code may be stored or adapted for storage on one or more tangible, machine-readable media, such as on data repository chips, local or remote hard disks, optical disks (that is, CDs or DVDs), solid-state drives, or other media, which may be accessed by the processor-based system to execute the stored code.

Although specific features of various embodiments of the present systems and methods may be shown in and/or described with respect to some drawings and not in others, this is for convenience only. It is to be understood that the described features, structures, and/or characteristics may be combined and/or used interchangeably in any suitable manner in the various embodiments, for example, to construct additional assemblies and techniques for use in wireless communications.

While only certain features of the present systems and methods have been illustrated and described herein, many modifications and changes will occur to those skilled in the art. It is, therefore, to be understood that the appended claims are intended to cover all such modifications and changes as fall within the true scope of the invention.

The invention claimed is:

1. An emulator for emulating a test scenario corresponding to a connected vehicle application, comprising:
    a test bed configured to test a device under test (DUT) that is communicatively coupled to one or more emulated intelligent transportation system (ITS) stations, wherein the DUT and each of the emulated ITS stations comprise a vehicle on-board unit (OBU) or an infrastructure unit (IU), and wherein the test bed further comprises:
        a processor configured to execute one or more instructions to emulate a test scenario comprising one or more simulated events involving the DUT and at least one of the emulated ITS stations, the processor comprising: a mobility engine configured to:
            generate and periodically update one or more mobility parameters corresponding to the DUT and each of the emulated ITS stations for the simulated events based on corresponding configuration parameters, wherein the configuration parameters define a behavior of the DUT and each of the emulated ITS stations during one or more simulated events in the test scenario, and the updating is performed using path information in the configuration parameters to generate a desired position, a desired direction of travel, and a desired velocity for each of the plurality of emulated ITS stations and the DUT,
            generate throttle, braking, and steering information for each of the emulated ITS stations and the DUT based on the desired position, the desired direction of travel, and the desired velocity, and
            generate a simulated position, velocity, acceleration, brake status, indicator light status, steering angle, and yaw rate for each of the emulated ITS stations and the DUT based on the throttle, braking, and steering information;
        a channel emulator configured to generate one or more channel models for emulating one or more wireless channel conditions between the DUT and one or more of the emulated ITS stations based on the corresponding mobility parameters;
        a controller area network (CAN) simulator configured to emulate one or more CAN signals that are transmitted and received by one or more internal components corresponding to one or more of the DUT and the emulated ITS stations based on the corresponding mobility parameters;
        a global navigational satellite system (GNSS) simulator configured to generate one or more GNSS signals for simulating mobility of one or more of the DUT and the ITS stations based on the corresponding mobility parameters; and
        a transceiver operatively coupled to the processor and configured to generate and transmit one or more periodic messages between the DUT and one or more of the emulated ITS stations and one or more asynchronous messages between the DUT and one or more of the emulated ITS stations upon occurrence of one of the simulated events;

wherein the processor is configured to validate a desired functionality of the DUT by determining if one or more of the periodic messages and the asynchronous messages are generated by the DUT as expected within a defined time limit.

2. The emulator of claim 1, further comprising a memory communicatively coupled at least to the processor for storing the configuration parameters, the configuration parameters comprising at least one of a station identifier (ID), a speed, an acceleration, a deceleration, one or more vehicle profile parameters, a confidence ratio for each of the vehicle profile parameters, and route information of an emulated OBU, and a station ID, one or more station profile parameters, a confidence ratio for each of the station profile parameters, a position, a station type, a warning type of an emulated infrastructure unit, station context information corresponding to the plurality of emulated OBUs and IUs, DUT station context information, and a set of instructions for testing the DUT.

3. The emulator of claim 2, wherein the memory stores the configurations parameters defined for the test scenario in a scenario configuration file, and wherein the processor is configured to playback the scenario configuration file for validating a bug fix, a subsequent test of the DUT, or a combination thereof.

4. The emulator of claim 1, wherein the GNSS simulator is configured to receive the configuration parameters for generating varying GNSS signals for controlling a position of one or more of the DUT and the ITS stations, simulating movement along real road topologies comprising at least one of a straight road, a cross road, and a curved road, simulating desired atmospheric conditions, simulating obstructions, or combinations thereof.

5. The emulator of claim 1, wherein the channel emulator receives one or more channel model parameters for computing the channel models for emulating one or more wireless channel conditions between the DUT and one or more of the emulated ITS stations using the configuration parameters, the position, and the velocity of each of the emulated ITS stations and the DUT, and wherein the channel models comprise one or more of a fading channel model, log-distance path loss model, Doppler shift model, and Ray tracing model.

6. The emulator of claim 1, wherein channel emulator is configured to emulate the same channel conditions between the DUT and each of the emulated ITS stations, or to configure different channel conditions between the DUT and each of the emulated ITS stations based on the corresponding mobility parameters.

7. The emulator of claim 1, wherein the processor further comprises an emulation manager configured to synchronously control the mobility engine to generate the mobility parameters for the DUT and each of the emulated ITS stations, the GNSS emulator for generating varying GNSS signals to simulate one or more of atmospheric, mobility, and spatial topology conditions defined in the test scenario, the CAN simulator for emulating CAN signals for simulating an internal vehicle dynamics of the DUT defined in the test scenario, and the channel emulator for emulating the wireless channel conditions defined in the test scenario.

8. The emulator of claim 1, wherein the transceiver is configured to:

transmit the periodic messages for the DUT in a time interleaved manner using a single transceiver such that the DUT is configured to perceive the periodic messages to have originated from a plurality of vehicles, a plurality of infrastructure units, or a combination thereof; and generate and transmit the asynchronous messages upon occurrence of the simulated events involving the DUT or any of the emulated ITS stations.

9. The emulator of claim 1, wherein the periodic messages and the asynchronous messages comprise one or more of a direct short range communication message, a cooperative awareness message, a decentralized environmental notification message, a signal phase and timing message, a basic safety message, and a map messages, and wherein the transceiver is configured to generate the periodic messages and the asynchronous messages in any message format defined for any geography.

10. The emulator of claim 1, wherein the test scenario comprises at least one of a blind spot warning scenario, a do not pass warning scenario, a forward collision warning scenario, an emergency brake application scenario, a road hazard detection scenario, an advanced driver assistance system (ADAS) support scenario, a cellular connected vehicle application scenario, non-line-of-sight scenarios in which ADAS sensors are ineffective, a protocol conformance test scenario for the DUT, an interoperability test scenario for testing a plurality of different devices under test.

11. The emulator of claim 1, further comprising a user interface device used for configuring the test parameters for the test scenario, the user interface device comprising:

a mapping service used for configuring real road topologies for the test scenarios and a graphical map based visualization of the test scenario;

a scenario configuration interface for defining test configuration parameters for defining a number of the participating ITS stations, one or more vehicle profile parameters and corresponding confidence ratios, one or more station profile parameters and corresponding confidence ratios, one or more channel models to be used for communications between each of the emulated ITS stations and the DUT, and one or more of atmospheric and spatial topology effects to be applied on the GNSS signal of the DUT;

a runtime information interface for displaying dynamic runtime information corresponding to the DUT and the emulated ITS stations; and a dashboard for visualizing a dashboard of a vehicle associated with the DUT, the periodic messages, the asynchronous messages, and a sequence of the simulated events in the test scenario.

12. The emulator of claim 1, wherein the processor further comprises:

a logger configured to log information originating from the DUT and the emulated ITS stations;

a test report generation module configured to generate a test report based on the logged information, wherein the test report includes at least one of a test pass status, a test fail status, a message latency value, a miss detection probability value, a false detection probability value, and a bit error rate (BER) value, and wherein the processor is configured to validate the desired functionality of the DUT by determining if one or more of the periodic messages, asynchronous messages and CAN signals are generated by the DUT as expected within the defined time limit based on the test report.

13. The emulator of claim 1, wherein the processor further comprises a customized security module configured to emulate the ITS stations such that authorized ITS stations are emulated using a valid digital certificate and unauthorized ITS stations are emulated using an invalid digital certificate.

14. The emulator of claim 1, wherein the emulator is integrated with a hardware in the loop systems for system level testing of one or more of the DUT associated with a vehicle and the ITS stations, one or more other control units within the vehicle, and a combination of the DUT with the other control units.

15. The emulator of claim 1, wherein the emulator conforms to one or more of: an Institute of Electrical and Electronics Engineers (IEEE) Wireless Access in Vehicular Environments (WAVE) standard, and a European Telecommunications Standards Institute (ETSI) Intelligent Transport Systems G5 standard.

16. A method for emulating a test scenario corresponding to a connected vehicle application, comprising:
- receiving one or more configuration parameters that define a behavior of a DUT and one or more emulated ITS stations during one or more simulated events involving the DUT and at least one of the emulated ITS stations in the test scenario, wherein the DUT is communicatively coupled to the emulated ITS stations, and wherein the DUT and each of the emulated ITS stations comprise a vehicle on-board unit (OBU) or an infrastructure unit;
- generating and periodically updating one or more mobility parameters corresponding to the DUT and each of the emulated ITS stations for the simulated events by a mobility engine based on corresponding configuration parameters, the updating being performed using path information in the configuration parameters to generate a desired position, a desired direction of travel, and a desired velocity for each of the plurality of emulated ITS stations and the DUT;
- generating throttle, braking, and steering information for each of the emulated ITS stations and the DUT based on the desired position, the desired direction of travel, and the desired velocity;
- generating a simulated position, velocity, acceleration, brake status, indicator light status, steering angle, and yaw rate for each of the emulated ITS stations and the DUT based on the throttle, braking, and steering information;
- generating one or more channels for emulating one or more wireless channel conditions between the DUT and one or more of the emulated ITS stations by a channel emulator based on the corresponding mobility parameters;
- emulating one or more CAN signals that are transmitted and received by one or more internal components corresponding to one or more of the DUT and the emulated ITS stations by a CAN simulator based on the corresponding mobility parameters;
- generating GNSS signals for simulating mobility of one or more of the DUT and the emulated ITS stations by a GNSS simulator based on the corresponding mobility parameters, wherein the mobility engine, the channel emulator, the CAN simulator, and the GNSS simulator integrated within a single test bed in an emulator are synchronously controlled to generate the mobility parameters, generate the channel models, emulate the CAN signals, and generate the GNSS signals, respectively;
- applying the corresponding mobility parameters, the channel models, the CAN signals, and the GNSS signals to the DUT to holistically emulate and execute the test scenario;
- generating and transmitting one or more periodic messages for the DUT from one or more of the emulated ITS stations and one or more asynchronous messages between the DUT and one or more of the emulated ITS stations upon occurrence of one of the simulated events during execution of the test scenario; and
- validating a desired functionality of the DUT by determining if one or more of the periodic messages, the asynchronous messages and further CAN signals are generated by the DUT as expected within a defined time limit.

* * * * *